United States Patent
Morikawa et al.

(10) Patent No.: US 6,272,979 B1
(45) Date of Patent: Aug. 14, 2001

(54) APPARATUS FOR SUPPLYING FOOD DOUGH

(75) Inventors: Michio Morikawa; Kenji Takao, both of Utsunomiya (JP)

(73) Assignee: Rheon Automatic Machinery Co., Tochigi-Ken (JP)

(*) Notice: Subject to any disclaimer, the term of this patent is extended or adjusted under 35 U.S.C. 154(b) by 0 days.

(21) Appl. No.: 09/655,782

(22) Filed: Sep. 6, 2000

(30) Foreign Application Priority Data

Sep. 8, 1999 (JP) .................................................. 11-254613

(51) Int. Cl.[7] ............................. A21C 3/06; A21C 11/00; A23P 1/00; A21D 6/00; A23L 1/00
(52) U.S. Cl. .................... 99/450.2; 99/353; 99/450.1; 425/92; 425/321; 425/325; 425/335
(58) Field of Search ...................... 99/353, 450.1–450.8, 99/494; 425/321, 322, 297, 325, 329, 335, 391, 92, 115, 133.1, 131.3, 112; 426/500–503, 512, 496, 231; 198/456, 379, 468.3

(56) References Cited

U.S. PATENT DOCUMENTS

| 4,905,583 | * | 3/1990 | Hayashi ............................ 99/450.2 |
| 4,994,293 | * | 2/1991 | Hayashi ............................ 426/501 |
| 4,996,915 | * | 3/1991 | Morikawa et al. ............... 99/450.2 |
| 5,078,585 | * | 1/1992 | Morikawa et al. ............... 425/321 X |
| 5,142,631 | * | 8/1992 | Ueno et al. ...................... 414/783 X |
| 5,169,664 | * | 12/1992 | Ueno et al. ...................... 198/379 X |
| 5,219,592 | * | 6/1993 | Hirabayashi et al. ............ 425/383 |
| 5,281,120 | * | 1/1994 | Morikawa et al. ............... 425/115 |
| 5,382,154 | * | 1/1995 | Morikawa et al. ............... 425/321 |
| 5,421,714 | * | 6/1995 | Morikawa et al. ............... 426/500 X |
| 5,440,974 | * | 8/1995 | Ueno et al. ...................... 99/450.2 |
| 5,460,081 | * | 10/1995 | Ueno et al. ...................... 99/353 X |
| 5,516,538 | * | 5/1996 | Ueno et al. ...................... 426/231 |

* cited by examiner

Primary Examiner—Timothy F. Simone
(74) Attorney, Agent, or Firm—Finnegan, Henderson, Farabow, Garrett & Dunner L.L.P.

(57) ABSTRACT

An apparatus for supplying food dough is provided. It can be made compact, easily assembled, and easily cleaned. The apparatus includes a hopper (3) for receiving a food dough F, a first cutter (7) for dividing the food dough into dough pieces, a transmitting conveyor (11) for transmitting the dough pieces, a dough feeder (9) for forming a dough sheet from the dough pieces, a feeding conveyor (13) for feeding the dough sheet, a metering conveyor (15) for weighing a part of the dough sheet, and a second cutter (19) for cutting out the part of the dough sheet when the valve measured by the first metering conveyor (15) reaches a predetermined value. The first cutter (7) and the dough feeder (9) are arranged such that when the dough piece is cut out by the first cutter, the lower end fans into an inlet of the dough feeder. The belt of the transmitting conveyor (11) is wound around the uppermost roller (55A) of the dough feeder (9). Also, any one of the hopper (3), the first cutter (7), the feeding conveyor (13), and the metering conveyor (15) can easily be combined and separated from the apparatus.

6 Claims, 11 Drawing Sheets

APPARATUS FOR SUPPLYING FOOD DOUGH

FIELD OF INVENTION

The present invention relates to an apparatus for supplying food dough such as bread dough. Particularly, it relates to one whose entire structure is compact and which can be easily cleaned and assembled.

BACKGROUND OF THE INVENTION

Japanese Patent Laid-open Publication No. Hei 11-155464 discloses a prior-art apparatus. It includes a cutter that is located at a lower opening of a hopper that can receive a large block of dough. The cutter cuts the large block of dough into dough pieces that have a predetermined length and a constant volume. The dough pieces are fed, by a conveyor that is positioned below the cutter, to a forming hopper. Then the dough pieces are supplied downward to a dough-feeder section. It has a plurality of rollers that are positioned like a V. The dough pieces are formed by the dough-feeder section as a sheet. Then the dough sheet is fed by a conveyor that is positioned below the dough-feeder section to the next step.

The prior-art apparatus can advantageously and continuously form large blocks of dough into a sheet. However, it has a disadvantage in that it cannot but be relatively large. This disadvantage should be overcome. Also, the prior-art apparatus has another disadvantage in that it is difficult to clean it when it is stopped or to assemble it. Also, such a prior-art apparatus has a metering conveyor It measures the part of the weight of dough that is on it. The cutter cuts part of the dough when its weight reaches a predetermined value. If flour adheres to the surface of the metering conveyor, the accuracy of the measurement can decrease.

SUMMARY OF THE INVENTION

To overcome the above disadvantages of the prior-art apparatus, this invention was conceived. One object of it is to provide an apparatus for supplying food dough. It comprises a hopper that receives a large block of dough, a first cutter located at a lower opening of the hopper to cut the large block to dough pieces that have a predetermined length and a volume, a transmitting conveyor for transmitting the dough pieces, which are cut out by the cutter, to a dough feeder, said dough feeder having a plurality of rollers that are positioned like a V to form a dough sheet that has a constant thickness, a feeding conveyor for feeding the dough sheet, which is formed by the dough feeder to have the constant thickness, a metering conveyor for measuring the weight of a part of the dough sheet, which is supplied by the feeding conveyor while the metering conveyor feeds the dough sheet, and a second cutter for cutting out the part of the dough sheet when its weight that is measured by the metering conveyor reaches a predetermined value, characterized ill that the first cutter and the dough feeder are arranged so that a part of the first cutter overlaps a part of an inlet of the dough feeder such when the dough piece is cut out by the first cutter, the lower end of the dough piece falls into an inlet of the dough feeder.

The belt of the transmitting conveyor is wound around the uppermost roller of the dough feeder.

Any one of the hopper, the first cutter, the feeding conveyor, and the metering conveyor can easily be combined with and separated from the apparatus.

An apparatus for supplying food dough is also provided. It comprises a hopper that receives a large block of dough, a first cutter located at a lower opening of the hopper to cut the large block to dough pieces that have a predetermined length and volume, a dough feeder for forming a dough sheet from the dough pieces, which are cut by the first cutter, a feeding conveyor for feeding the dough sheet, which is formed by the dough feeder to have a constant thickness, a first metering conveyor for measuring the weight of a part of the dough sheet, which is supplied by the feeding conveyor, while the metering conveyor feeds the dough sheet, and a second cutter for cutting out the part of the dough sheet when its weight that has been measured by the first metering conveyor reaches a predetermined value, characterized in that a second metering conveyor or a relative speed controlling conveyor is located near the first metering conveyor such that the relative speed between the feeding speed of the first metering conveyor and that of the second metering conveyor or the relative speed controlling conveyor is controllable, and in that the thickness and length of the part of the dough sheet that is cut by the second cutter can be controlled when the part of the dough sheet is transmitted from the first metering conveyor or the relative speed controlling conveyor.

The feeding speed of at least one of the first and second metering conveyors can be controlled, or the feeding speed of at least one of the first metering conveyor and the relative speed controlling conveyor can be controlled.

Also, an apparatus for supplying food dough is provided. It comprises a hopper that receives a large block of dough, a first cutter located at a lower opening of the hopper to cut the large block to dough pieces that have a predetermined length and a volume, a dough feeder for forming a dough sheet from the dough pieces, which are cut by the fast cutter, a feeding conveyor for feeding the dough sheet, which is formed by the dough feeder to have a constant thickness, a metering conveyor for measuring weight of a part of the dough sheet, which is supplied by the feeding conveyor, while the metering conveyor feeds the dough sheet, and a second cutter for cutting out the part of the dough sheet when its weight that is measured by the first metering conveyor reaches a predetermined value, characterized in that a zero adjustment is carried out for the metering conveyor without putting the dough sheet on it when the metering conveyor measures parts of the dough sheet a predetermined numbers of times or when a predetermined time passes.

DESCRIPTIONS OF THE PREFERRED EMBODIMENTS

Based on the drawings an embodiment of this invention is now explained. However, first, the entire construction of the embodiment is roughly explained.

Figure 1:
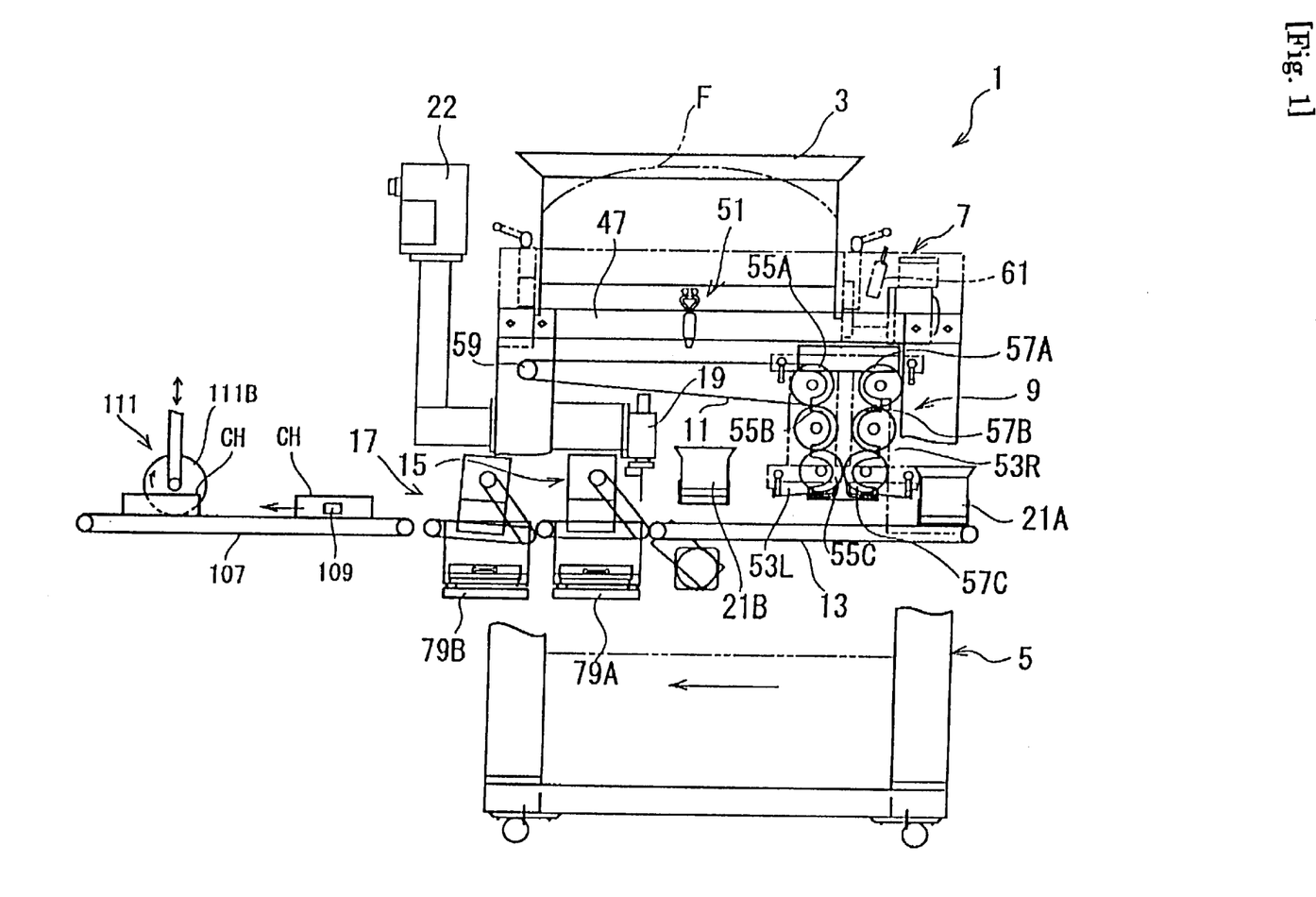
FIG. 1 is a schematic front view of the embodiment of an apparatus for supplying food dough.

FIG. 1 shows an apparatus 1 for supplying food dough of an embodiment of this invention. It has a hopper 3 at the upper part of the apparatus to receive a large block F of food dough such as bread dough. The hopper 3 can be separated from the apparatus. A cutter 7 is attached to a frame 5 at a position corresponding to a lower opening of the hopper 3. The cutter 7 can be disengaged from the frame 5. The cutter cuts the large block F to dough pieces that have a predetermined length (corresponding to the longitudinal length of the hopper 3) and a predetermined weight.

A transmitting conveyor 11 is located below the cutter 7 to transmit the dough pieces, which are cut by the cutter 7, to a dough feeder 9. It has a plurality of rollers that are arranged like a V. A feeding conveyor 13 is located below the dough feeder 9. The dough feeder 9 combines the dough pieces and forms a dough sheet that has a constant thickness. The feeding conveyor 13 feeds the dough sheet. The feeding conveyor 13 can be separated from the dough feeder 9.

A first metering conveyor 15 is located near the end of the feeding path of the feeding conveyor 18 to measure the weight of a part of the dough sheet while the part is being fed. A second metering conveyor 17 is positioned near the first metering conveyor 15. The first and second metering conveyors 15 and 17 can be separated from the apparatus.

A guillotining cutter 19 is located above a position between the feeding conveyor 13 and the first metering conveyor 15. When the first metering conveyor 15 measures a part of a dough sheet that has a predetermined weight, the cutter 19 is operated to cut out that part of the dough sheet. Supplying apparatuses 21A and 21B are located near the beginning and ending points of the feeding path of the feeding conveyor 13 to supply flour to its surface. Also, a controller 22, such as a computer, is positioned so as to control the apparatus.

When a large block F of food dough is supplied to the hopper 3, a part of the block F flows downward from the lower opening of the hopper 3. Then the part of the block F is cut by the cutter 7 into dough pieces. They have a predetermined length. They fall to the surface of the transmitting conveyor 11. The transmitting conveyor 11 feeds them to the dough feeder 9. It foxes the dough pieces into a dough sheet that has a constant thickness. The dough sheet is fed by the feeding conveyor 13 to the first metering conveyor 15. As a part of the dough sheet is continuously fed on the first metering conveyor 15, it continuously measures the weight of the part. When the weight of the part reaches a predetermined weight, the cutter 19 is operated to cut out the part of the dough sheet into a chunk. Then the chunk is fed to the second metering conveyor 17. It again weighs the part. If the weight of that part, data on which is obtained by the first metering conveyor, is within an acceptable range, the above steps are repeated. That is, another part of the dough sheet is weighed and cut into a chunk. This is repeated so, that chunks are made. The chunks are then transmitted to a next step. If the data on the weight that is obtained by the second metering conveyor is less than the predetermined value, a feedback control is operated. Thus, the timing at which the cutter 19 cuts the dough sheet into the chunks is adjusted to be delayed. If the weight is above the predetermined value, the feedback control acts to accelerate the timing. Thus, chunks that all have weights within a predetermined range can be made. Then they are fed to the next step.

The hopper 3 and the cutter 7 are constructed such that they can be readily engaged with and disengaged from the apparatus Also, they are constructed such that they can easily be cleaned when they are stopped, for example.

Figure 7:
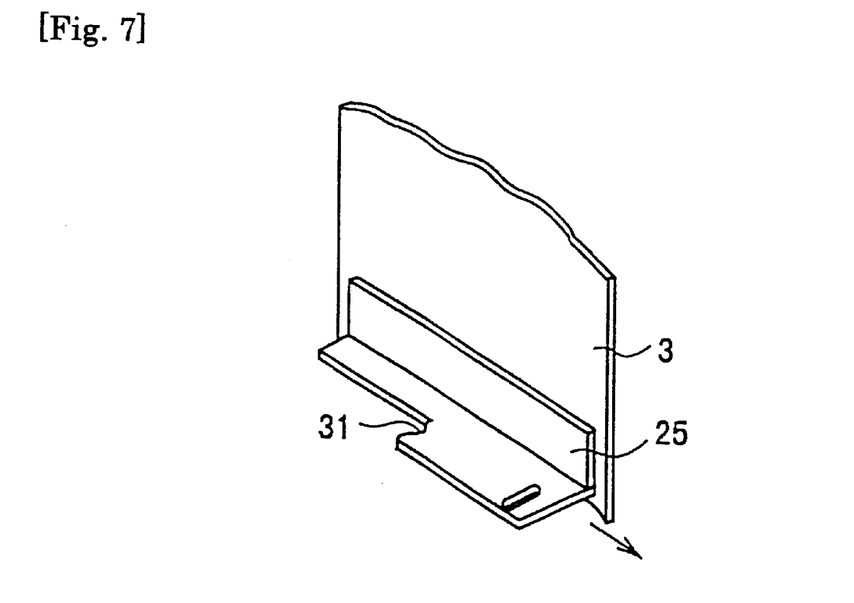
FIG. 7 is a perspective view of a supporting bracket.

As in FIGS. 2–7, the hopper 3 has a covering member 23 at its upper end. The hopper 3 is hollow. The member 23 can be attached to and separated from the hopper 3. Supporting brackets 25, 25 are fixed at the approximate middle positions of the left and right side surfaces of the hopper 3 The brackets 25, 25 are L-shaped. They extend toward the front and rear. The brackets 25, 25 are supported on left and right supporting frames 27, 27 of the cutter 7. An engaging section 31 is formed on the horizontal part of each bracket 25 (FIG. 7). The engaging section 31 can be engaged with and disengaged from a knob 29, which is positioned on the supporting frame 27, when the hopper 3 is moved in a horizontal plane from the front of the apparatus to its rear, or vice versa.

Thus, the hopper 3 can be attached to the cutter 7 by first putting the supporting brackets 25, 25 of the hopper 3 on the left and right supporting frames 27, 27 of the cutter 7, then engaging the engaging section 31 of the supporting brackets 25, 25 with the knobs 29, 29 of the supporting frames 27, 27, and then locking the knobs 29, 29. When the knobs 29, 29 are unlocked the hopper 3 can be separated from the cutter 7.

As stated above, the hopper 3 can be easily combined with and separated from the cutter 7 Thus, they both can readily be cleaned. Also, they can easily be assembled when they are manufactured.

As the dough block F moves downward from the lower opening of the hopper 3, the cutter 7 cuts it along a predetermined length (corresponding to the length of the hopper 3) to form dough pieces. They have a predetermined volume As in FIG. 6, the cutter 7 has a pair of shafts 35A, 35B. They are rotatably and horizontally positioned across the hopper. They have a plurality of blades 33. They are fixed on the shafts. The supporting frames 27, 27 are vertically positioned at the left and right sides of a casing 37. The casing 37 supports the shafts 35A, 35B such that they are rotatable.

Figure 2:
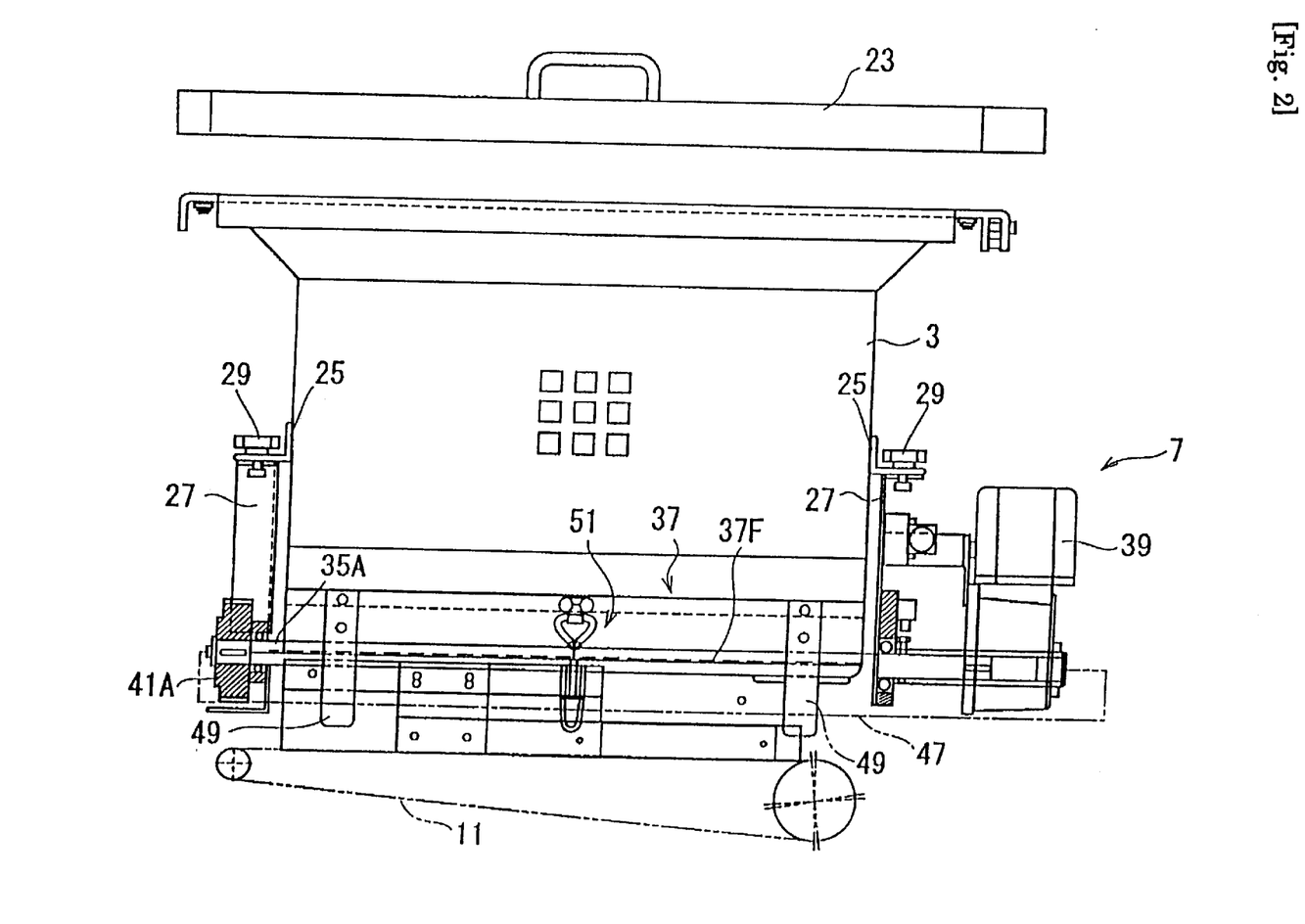
FIG. 2 is a front view of the apparatus in FIG. 1 to show the location of the hopper and cutter.
Figure 3:
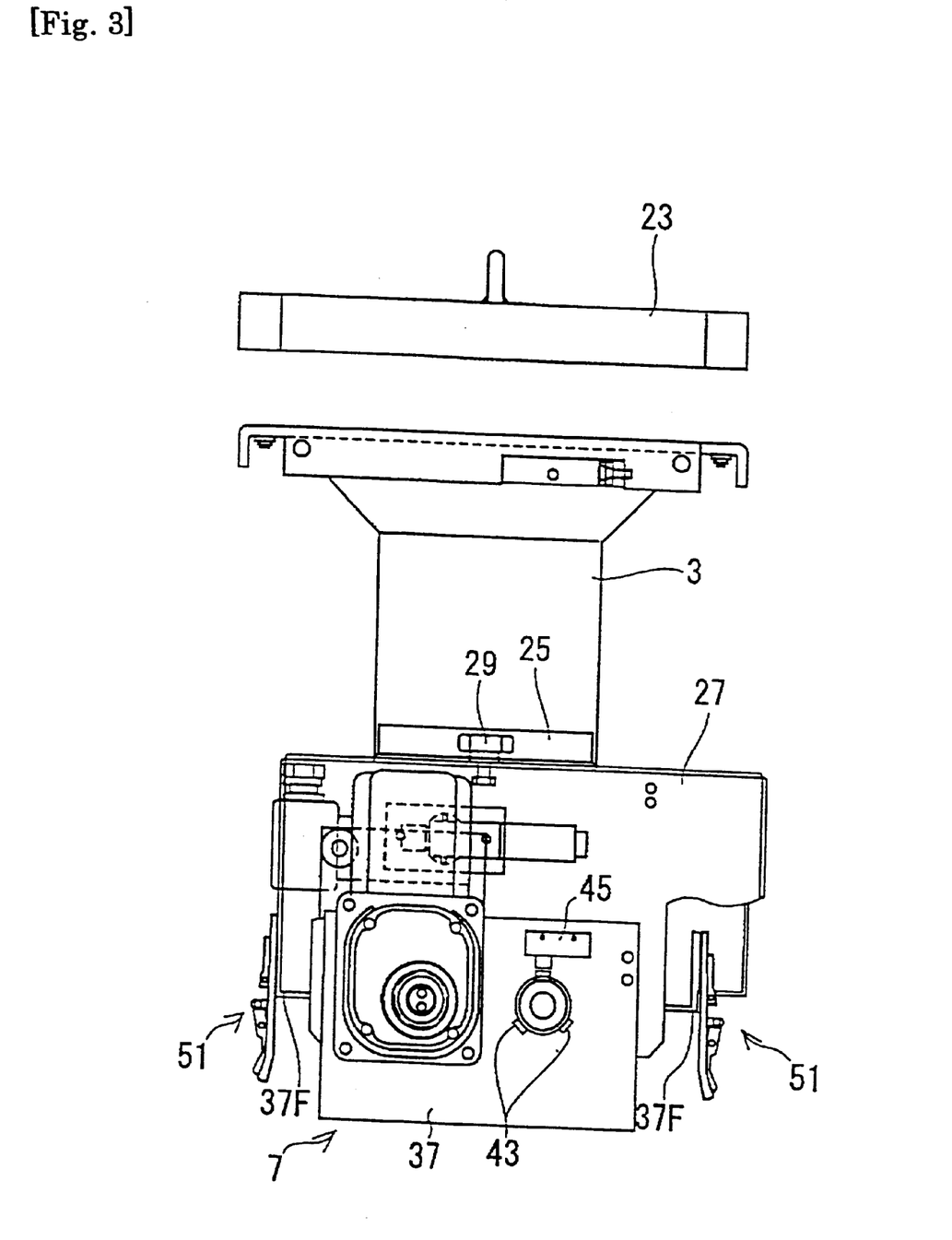
FIG. 3 is a right-side views, of the apparatus in FIG. 1 to show the location of the hopper and cutter.
Figure 4:
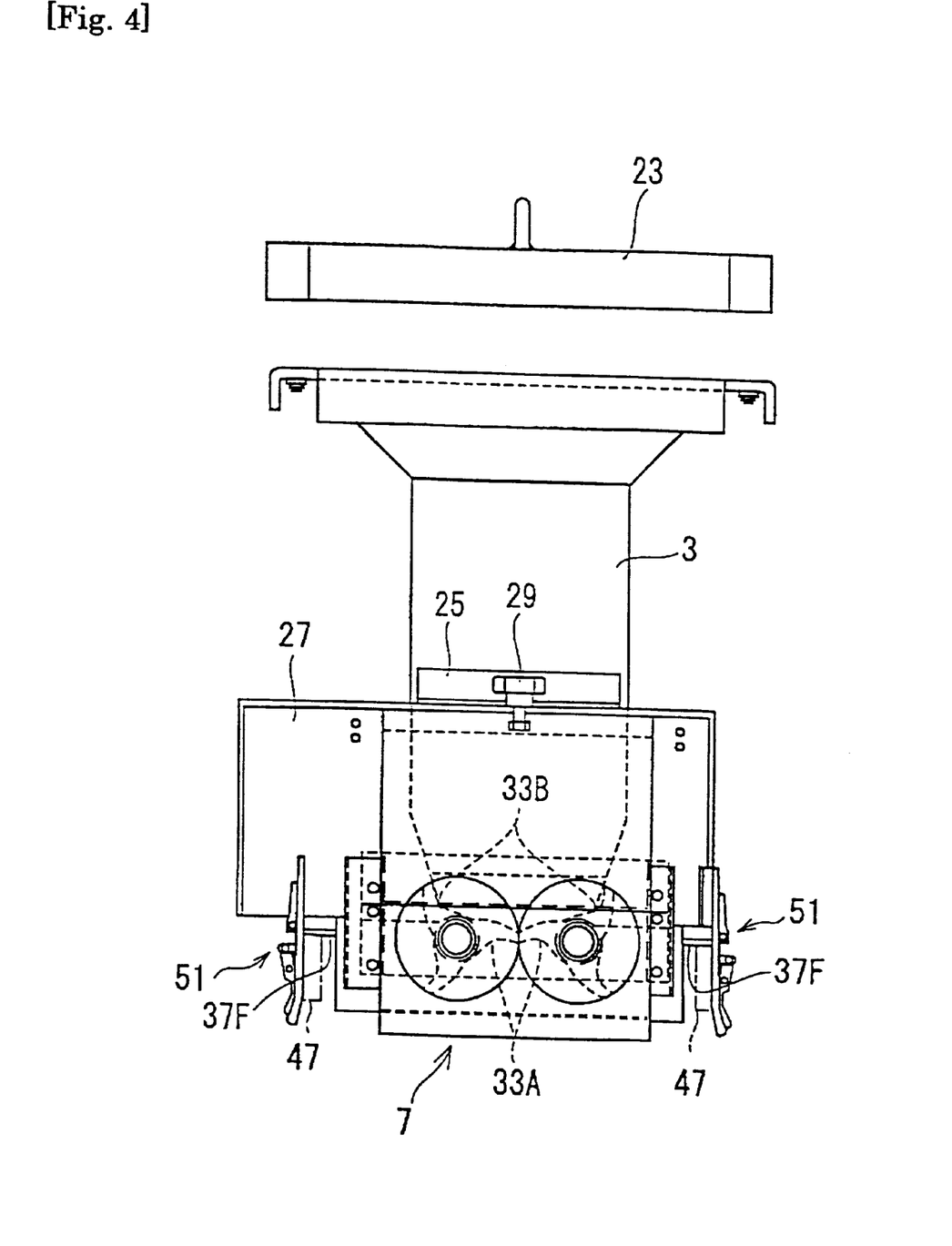
FIG. 4 is a left-side view of the apparatus in FIG. 1 to show the location of the hopper and cutter.
Figure 5:
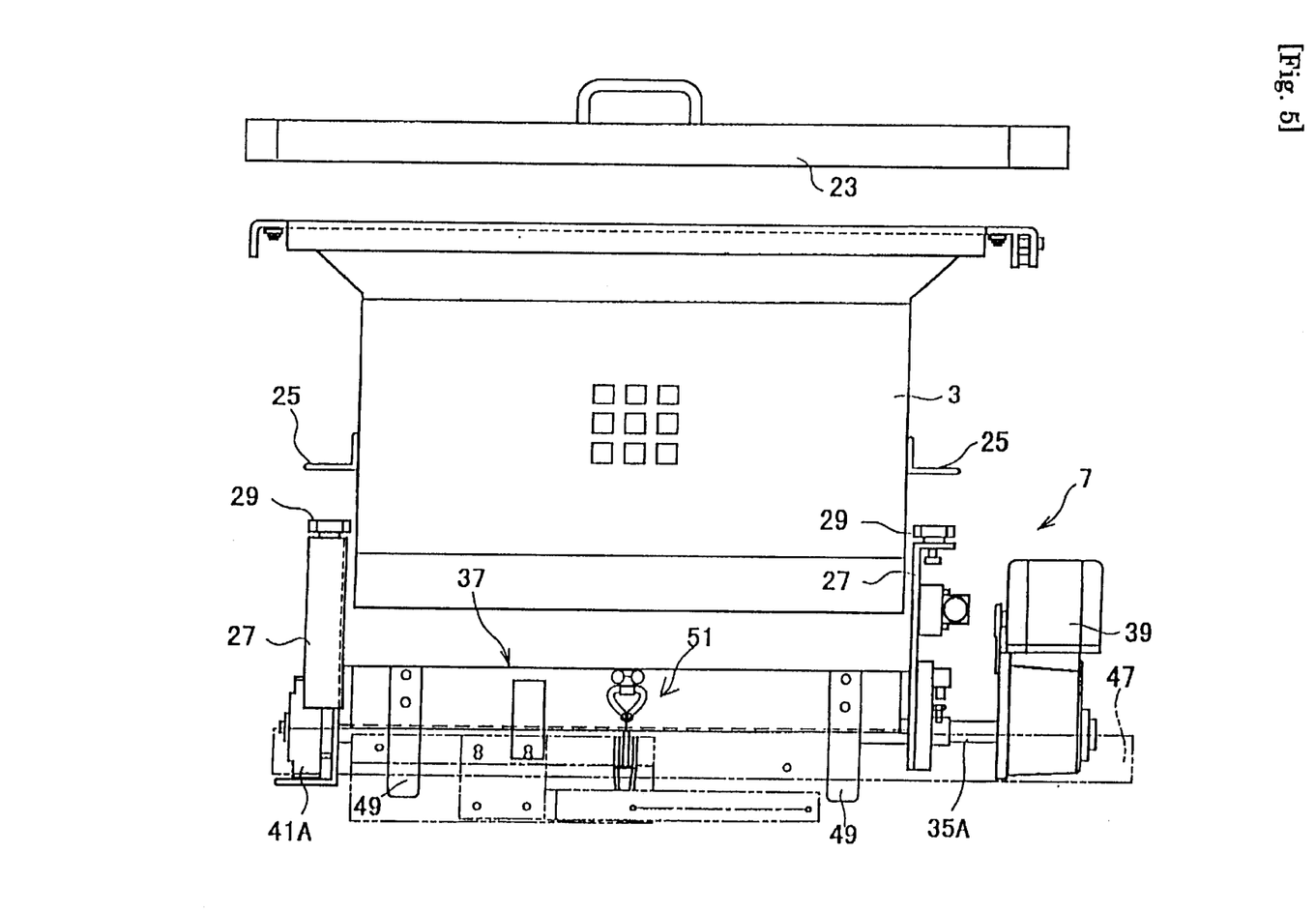
FIG. 5 is a front view of the apparatus in FIG. 1 to show the apparatus from which the hopper and the cutter are separated.
Figure 6:
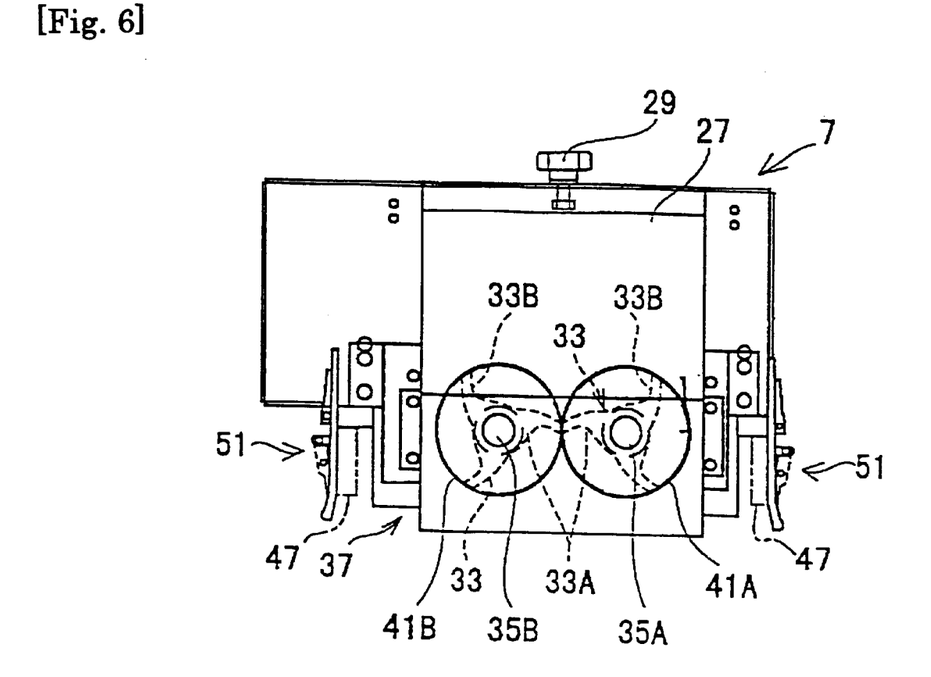
FIG. 6 is a left-side view of the cutter.

As in FIG. 2, one end of the shaft 35A is connected to an outer shaft of a driving motor 39. The motor is supported by the supporting frame 27. Gears 41A, 41B, whose diameters are the same, are connected to the other end of the shaft 35A and one end of the shaft 35B. The gears are engaged with each other (FIGS. 2 and 6) A plurality of dogs 43, corresponding to the plurality of the blades 33, are fixed to the other end of the shaft 35B (FIG. 3). A sensor 45, such as a micro switch, is attached to the casing 37 so as to stop the driving motor 39 when it is actuated by any dog 43. When the controller 22 outputs a command to operate the driving motor 39 of the cutter 7, the driving motor 39 allows the shafts 35A, 35B to be rotated inward or inversely The blades 33 start rotating under a condition where, as in FIGS. 4 and 6, the ends of the blades 33A, 33A are near each other. When the ends of the blades 33B, 33B approach each other, the dog 43 corresponding to one of the blades 33B is detected, so that the driving motor 39 is stopped. Thus, parts of the dough block F are continuously cut out at intervals corresponding to the conditions where the ends of blades 33A, 33B, . . . are approach each other in turn. Thus, the parts can have a predetermined volume. Then the parts fall.

Long supporting beams 47, 47 are horizontally located along the upper front and rear sides of the frame 5. Lower surfaces 37F, 37F are formed on the lower sides of the casing 37 of the cutter 7 The surfaces 37F, 37F are supported by the beams 47, 47. Thus, the cutter 7 can be attached to and separated from the frame 5. A plurality of movement-limiting members 49 are attached to the front and rear sides of the casing 37 such that the members 49 impact the front and rear surfaces of the supporting beams 47, 47 Thus, the cutter 7 is prevented from moving frontward or rearward. Locks 51, 51 are attached to the front and rear surfaces of the cutter 7 to lock the cutter 7 to the frame 5. A lock for, e.g., a trunk can be used for the locks. Thus, no details of them will be given.

When the locks 51 are unlocked, the cutter 7 can be removed upward from the supporting beams 47, 47. They are fixed on the front and rear sides of the frame 5. Thus, the cutter 7 can be easily attached to the frame 5. Also, when the apparatus is stopped, the cutter 7 itself and the feeding conveyor 11, the dough feeder 9, etc., which are positioned below the cutter 7, can easily be cleaned.

FIG. 1 shows the dough feeder 9. It includes a plurality of rollers 55A, 55B, and 55C, and a plurality of rollers 57A, 57B, and 57C. The rollers are supported by left and right roller-supporting members 53L, 53R of the frame 5. The rollers are arranged to be V-shaped. No details on the elements of the apparatus that are the same as prior-art apparatuses will be given. Thus, only those points that differ from prior-art apparatuses will now be explained.

To simplify and make the apparatus compact the transmitting conveyor 11 is located above the inlet section of the dough feeder 9. The transmitting conveyor 11 is constructed by winding a belt around the roller 55A and an idle pulley 59 supported by the frame 5. The cutter 7 and the dough feeder 9 are arranged such that a part of the cutter 7 overlaps a part of the inlet section of the dough feeder 9. Also, the inlet section of the dough feeder 9 is located near the cutter 7. Thus, when a part of the dough block is cut out by the cutter 7, simultaneously the lowest end of the part enters the inlet section.

The rollers 55B, 55C, 57A, 57B, and 57C are interlocked by a roller driving motor (not shown). The roller 55A is driven by a transmitting conveyor driving motor (not shown). These two motors are both controlled by the controller 22.

A distance sensor 61, located above the inlet section of the dough feeder 9, measures the distance between it and the dough piece that eaters the inlet section. When the distance that is detected by the sensor 61 is less than a predetermined value, the transmitting conveyor driving motor is controlled such that its rotational speed is decreased. In contrast, if the distance is greater than the predetermined value, the motor is controlled such that its rotational speed is increased. Thus, the volume of food dough that is supplied from the transmitting conveyor 11 to the dough feeder 9 is kept substantially constant.

The dough piece that is cut out from the dough block is fed by the transmitting conveyor 11 toward the dough feeder 9. When the rear end of the dough piece reaches a predetermined position, a capacitance sensor, for example, that is located at a relatively lower position above the transmitting conveyor 11, senses the rear end. Thus, the driving motor 39 for the cutter 7 is driven to cut out a part of the dough block. At that time the front end of the dough piece falls into the inlet section of the dough feeder 9, while the front end overlaps a part of the rear end of the preceding dough piece.

If an optical sensor is used to sense rear ends of dough pieces on the transmitting conveyor 11, it can only sense whether the rear end of a dough piece is present, but cannot sense the nature of the rear end. When a following dough piece is connected to the rear end of a preceding dough piece, the part connecting those pieces can narrow sharply. This embodiment uses a capacitance sensor (or a capacitance proximity switch) so as to sense the rear end of the dough piece on the transmitting conveyor 11. Thus, the nature of the part near the rear end of the dough piece, such as its width or thickness, can be known.

Thus, a following dough piece can be cut out from the dough block at a suitable time, such that the connection of the front end of the following dough piece to the rear end of the preceding dough piece is prevented from being constricted. It is desirable that a plurality of sensors be located along the width or length or both of the transmitting conveyor 11.

An optical sensor senses crumbs of the dough on the transmitting conveyor 11. However, a capacitance sensor does not sense any crumbs, and also, can sense the nature of the dough pieces. Thus, a capacitance sensor is desirable to sense the nature.

As stated above, the hopper 3 and the cutter 7 can be attached to and separated from the frame 5. Thus, when they are separated from the frame 5, the transmitting conveyor 11 and the dough feeder 9 can be easily cleaned. Also, the belt of the transmitting conveyor 11 is wound around the uppermost roller 55A of the dough feeder 9. Thus, the apparatus needs less components. The inlet section of the dough feeder 9 can be approached by the cutter 7. Also, the construction of the apparatus can be simplified. Also, a part of the inlet section of the dough feeder 9 vertically overlaps a part of the cutter 7. When a part of the dough block is cut out by the cutter 7, its front end falls directly into the inlet section of the dough feeder 9. Thus, in the dough feeder 9, the front end of a following dough piece adheres to the rear end of a preceding dough piece. The apparatus can be made compact. The height of the apparatus an be decreased.

Figure 8:
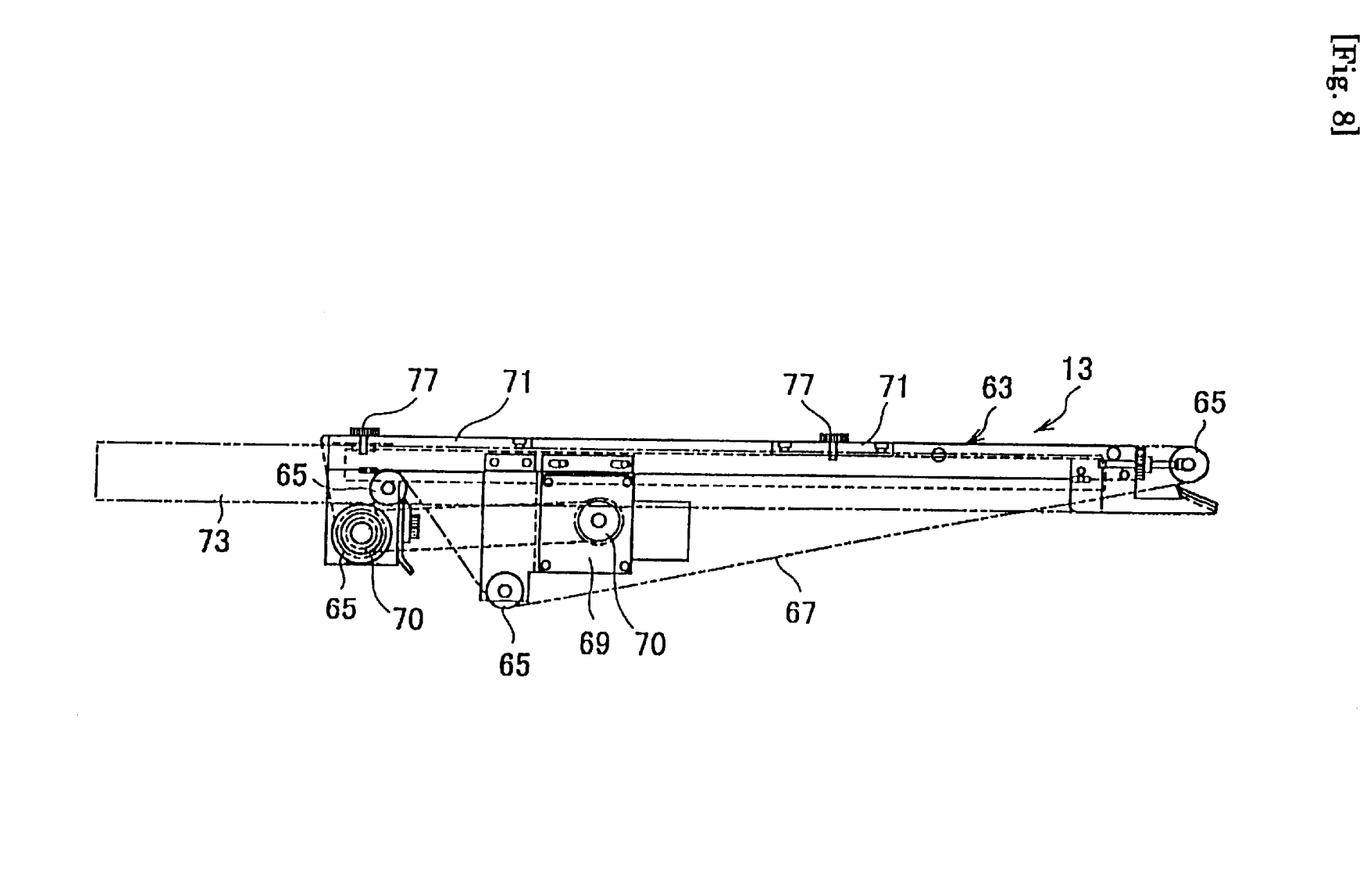
FIG. 8 is a front view of a feeding conveyor.
Figure 9:
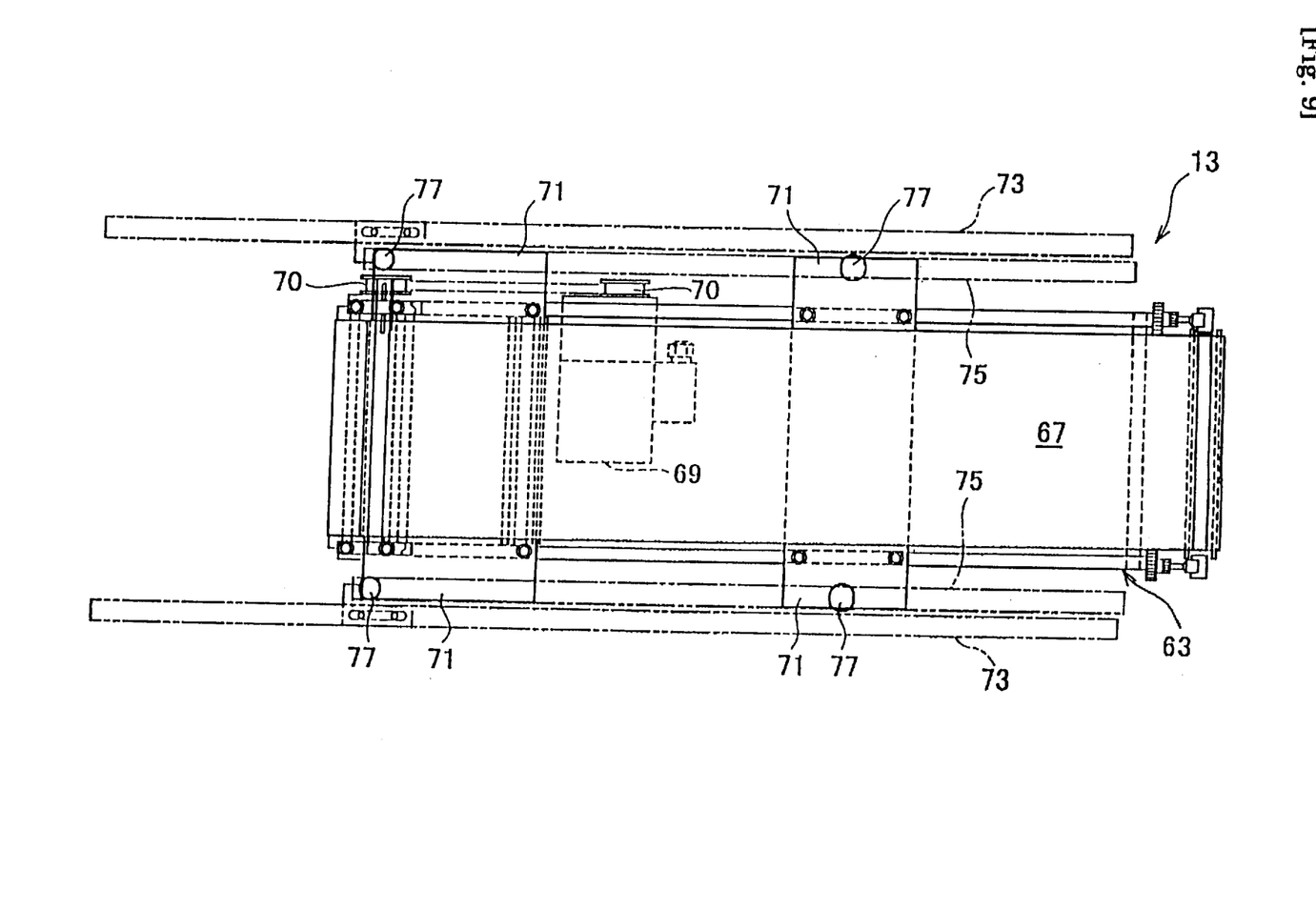
FIG. 9 is a plan view of the feeding conveyor.
Figure 10:
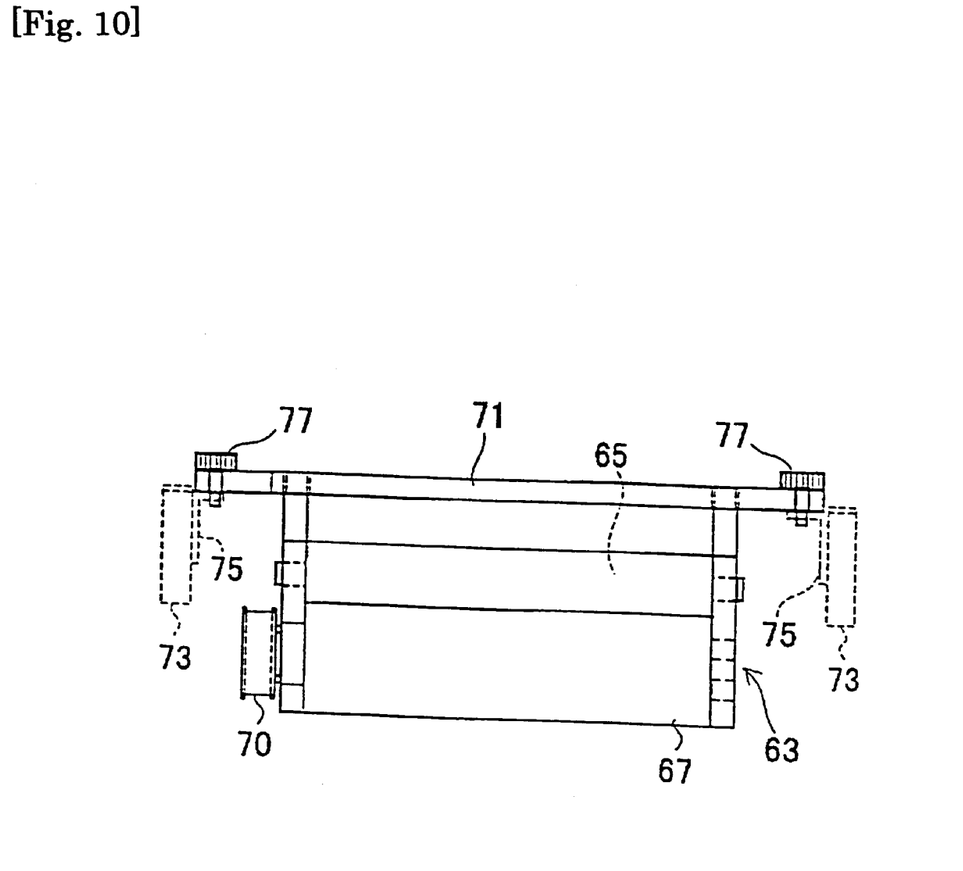
FIG. 10 is a left-side view of the feeding conveyor.

FIGS. 8–10 describe the feeding conveyor 13. It can be attached to and separated from the frame 5.

In detail, the feeding conveyor 13 feeds a dough sheet that has a uniform thickness to the first metering conveyor 15. The dough sheet is made by the dough feeder 9. A plurality of rollers 65 are attached to a conveyor frame 63. The rollers are rotatable. A belt 67 is wound around the rollers 65. A driving motor 69 is located on the frame 63 to drive the belt 67 through a transmission mechanical system having a pulley 70, belts, etc.

Supporting plates 71 are located on the conveyor frame 63. Both ends of the plates extend out of both of the front and rear sides of the apparatus. Each beam of a pair of long supporting beams 73 is horizontally located on the frame 5 along its respective front and rear sides. Each rail of a pair of supporting rails 75 is horizontally located along the respective inner sides of the supporting beams 73 to support the supporting plates 71 Each supporting plate 71 is fixed on the supporting rails 75 by knobs 77.

When the knobs 77 are unlocked, the feeding conveyor 13 can be pulled along the supporting rails 75 in the left and right directions of the apparatus. Thus, when the apparatus is manufactured, the feeding conveyor 13 can be easily assembled. Also, when the operation of the apparatus is stopped, the feeding conveyor 13 can easily be cleaned.

When the feeding conveyor 13 is separated from the apparatus, the dough feeder 9 can be cleaned from a lower position.

The controller 22 controls the conveyor driving motor 69 of the feeding conveyor 13 in relation to the dough feeder 9. That is, when a dough sheet that is formed by the dough feeder 9 is supplied to the belt 67 of the feeding conveyor 13, the dough sheet is transmitted first vertically and then horizontally. Thus, when the feeding direction of the dough sheet is changed, the dough sheet is bent. A distance sensor (not shown) is located at a predetermined position to sense the distance between it and the bent part of the dough sheet. The controller controls the speed of the feeding conveyor to always keep the distance constant. In other words, the controller controls the rotational speed of the conveyor driving motor 69 so that the curvature of the beat part of the dough sheet may be kept constant and so that the dough sheet may be prevented from being either tight or loose. Also, the controller controls the rotational speed of the roller driving motor of the dough feeder 9 so that its feeding volume may be controlled.

Figure 11:
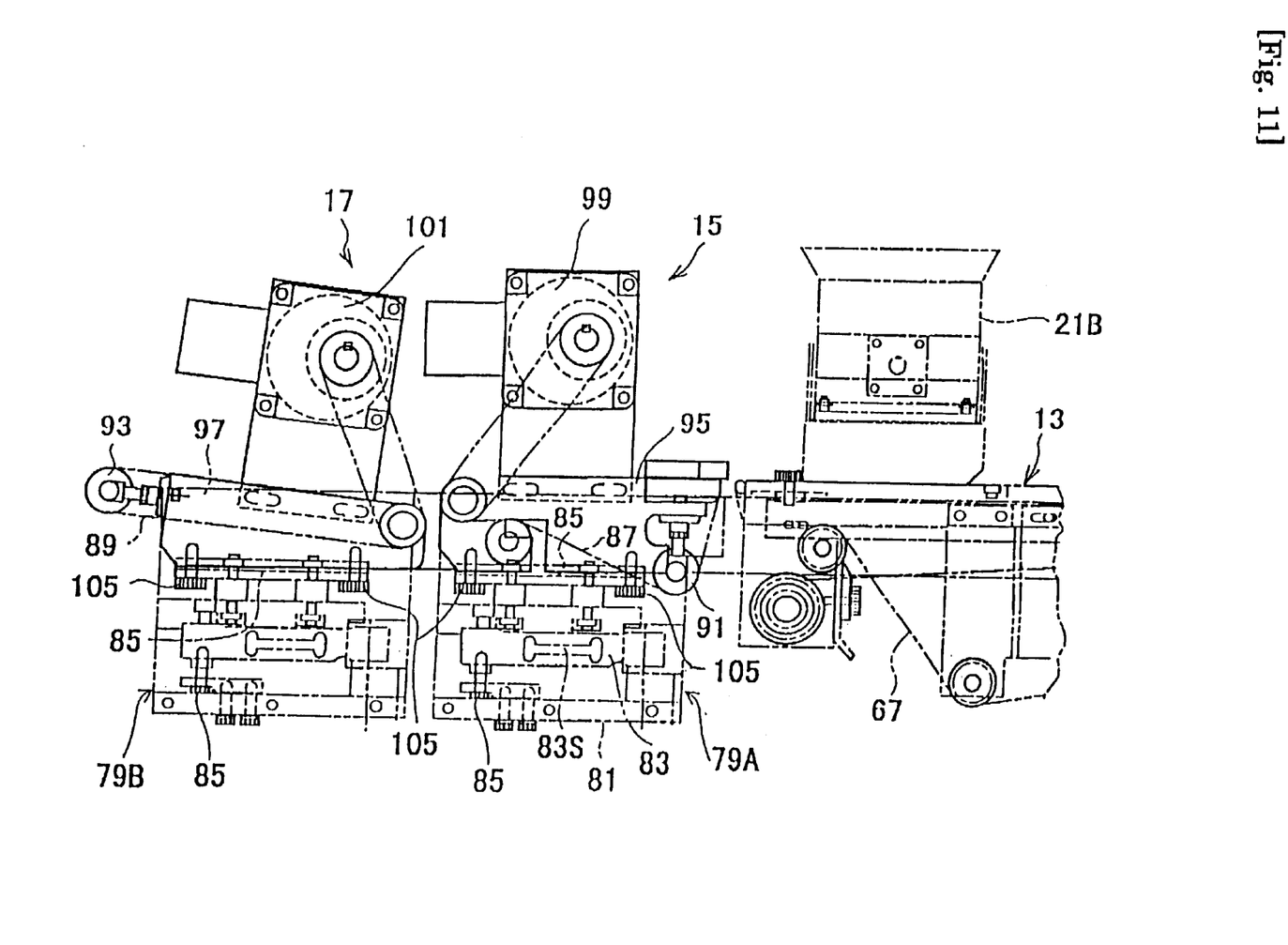
FIG. 11 is a front view of first and second metering conveyors. They are attached to the apparatus.
Figure 12:
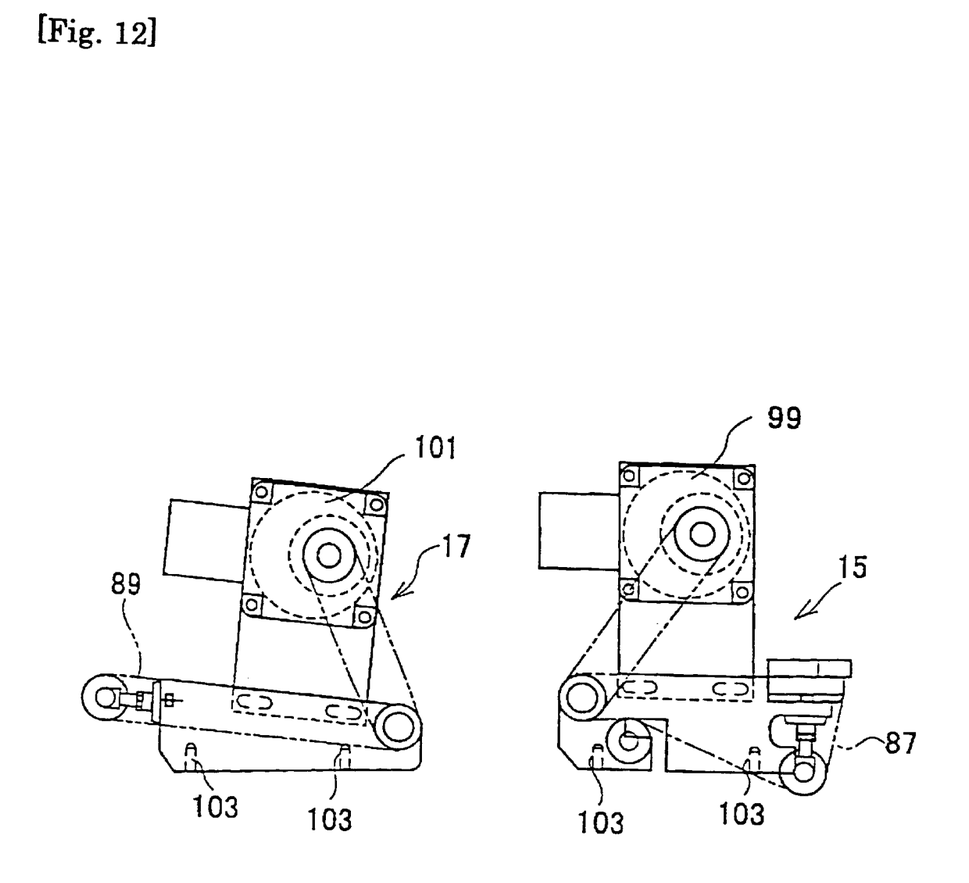
FIG. 12 is a front view of the first arid second metering conveyors.

FIGS. 11 and 12 describe the first and second metering conveyors 15, 17. They are used to measure the volume of the dough sheet. They can be easily attached to and separated from the frame 5. In detail, first and second metering devices 79A, 79B are attached to the frame 5. The first and second metering conveyors 15, 17 can easily be attached to and separated from the first and second metering devices 79A, 79B. The first and second metering devices 79A, 79B are identical. Thus, only the first metering device 79A is below explained The same reference numbers are used for the second metering device 79B to indicate the same components, to avoid duplicate descriptions.

The metering device 79A has a base block 81. It is unitary connected to the frame 5. FIGS. 11 and 12 do not show how the base block 81 is connected to the frame 5. A horizontal slit 83S is horizontally formed on a sensor block 83 such that it may easily be deflected. One end of the sensor block 83 is cantilevered on the base block 81. A stopper bolt 85 is attached to the other end of the sensor block 83. When an overload is applied to the sensor block 83, the stopper bolt 85 impacts the base block 81, so that the sensor block 83 can be prevented from being excessively deflected Also, a load sensor (not shown) such as a strain gauge is located on the sensor block 83 to detect its deflection and then to calculate the load A piezoelectric element may be used instead of the load sensor.

A bracket 85 is located on the upper surface of the sensor block 83. The metering conveyor 15 or 17 is attached to the bracket 85 in a way such that it can be separated from the bracket. That is, the first and second metering conveyors 15, 17 have roller bases 95, 97. They support a plurality of the rotatable rollers 91, 93, around which conveyor belts 87, 89 are wound. First and second driving motors 99, 101 are located on the roller bases 95, 97 to drive the conveyor belts 87, 89. Screw holes 103 are formed on the lower surfaces of the roller bases 96, 97. The roller bases 95, 97 can be attached to and separated from the brackets 85 by knobs 105. The knobs 105 engage the screw holes 103.

When the knobs 105 are unlocked, the first and second metering conveyors 15, 17 can be disengaged from the brackets 85. Thus, when the first and second metering conveyors 15, 17 are separated from the brackets, the first and second metering conveyors can easily be cleaned. Also, the guillotining cutter 19 can easily be cleaned.

The controller 22 controls both the first and second driving motors 99, 101 of the first and second metering conveyors 15, 17 and the guillotining cutter 19. That is, the guillotining cutter 19 is operated when the dough sheet is fed from the feeding conveyor 13 to the first metering conveyor 15 and when the weight of a part of the dough sheet reaches a predetermined value. As a result, the blade of the guillotining cutter 19 falls to cut out the part. As stated above, when the part of the dough sheet is cut to form a chunk the feeding conveyor 13 is slightly reversed to feed back the dough sheet until its front end is taken off the inlet of the first metering conveyor. Thus, the net weight of the chunk can be measured by the first metering conveyor.

The chunk of the dough sheet is then fed from the first metering conveyor 15 to the second metering conveyor 17. The chunk is again measured by the conveyor 17. The measurement data is transmitted to the controller as a feedback signal. The signal is used to adjust the timing of the cutter 19 to cut a part of the dough sheet. Thus, the accuracy of the measurement of the first metering conveyor and the accuracy of the timing of the cutter can be increased. After a part of the dough sheet is cut out by the cutter 19, the feeding conveyor 13 is kept waiting until the chunk is fed out of the first metering conveyor 15.

When the front end of the dough sheet is riding on the conveyor belt 87 of the first metering conveyor, it immediately begins measuring the weight of the part of the dough sheet on it. When the measured weight reaches a predetermined value, the controller sends all order signal to the cutter 19 to cut the dough sheet. Assuming that the conveying speed of the fist metering conveyor 15 is a speed V, and that the tie period from when the first metering conveyor 15 begins measuring the weight of the dough sheet to when the cutter 19 operates is a time period T then the length of the dough chunk that is cut out of the dough sheet can be calculated by the arithmetic unit of the controller by multiplying the speed V by the time period T (V*T).

The length of the dough chunk on the first metering conveyor is calculated by multiplying the speed V by the time period T. The measurement (V*T) is compared with a predetermined value L. When the measured valve is greater or less than the predetermined value L, the length of the dough chunk can be adjusted when the data on the measurement is transmitted from the first metering conveyor 15 to the second metering conveyor 17.

That is, assuming that the measured valve (V*T) corresponding to the length of the dough chunk is greater than the predetermined value L, then the feeding speed of the second metering conveyor 17 becomes the same as that of the first metering conveyor 15 after the dough chunk is cut out (i.e., V1=V2) In that case the relative speed between the first and second metering conveyors 15, 17 is adjusted such that the speed V2 is less than the speed V1 times α, to lessen the length of the dough chunk, where α is a value for a modification. The modification is determined based on the difference between the predetermined value L and the measurement (V*T).

In contrast, when the measured valve (V*T) is less than the predetermined value L, the relative speed between the first and second metering conveyors 15, 17 is adjusted such that the speed V2 is greater than the speed V1 times α, to lengthen the dough chunk.

As is already recognized, when the dough chunk is transmitted from the first metering conveyor 15 to the second metering conveyor 17, the length of the dough chunk is adjusted to a length corresponding to the predetermined value L, so that the thickness is changed accordingly. Thus, the weight of the dough chunk on the second metering conveyor 17 is always substantially constant. Also, its length and thickness are always substantially constant Thus, uniform dough chunks are sent to a next step. Thus, good dough products, e.g., whose sizes do not vary, can be made.

The embodiment of this invention successively uses the first and second metering conveyors 15, 17, so that the accuracy of the cutting and metering of the dough sheet can be increased. However, if the first metering conveyor 15 can accurately cut and measure the dough sheet, just a conveyor can be used instead of the second metering conveyor 17. The conveyor does not need any metering functions. But its conveying speed can be controlled in relation to the first metering conveyor.

Again as in FIG. 1, a dividing apparatus is located in a lower stream following the second metering conveyor 17 to divide the dough chunk into equal parts. That is, a feeding conveyor 107 is located behind the end of the second metering conveyor 17. A width sensor 109 is positioned to measure the width of the dough chunk CH It is fed along the feeding conveyor 107 Also, a cutter 111 is installed to cut the dough chunk CH. The cutter 111 can be moved up and down. Also, it can be moved in a direction corresponding to the width of the dough chunk. The cutter 111 can cut the dough chunk equally. It should be noted that the term "cut" means not only that the dough chunk is completely divided, but also that slits are made on it for a later division.

The width sensor 109 is composed of distance sensors that are located on both sides of the feeding conveyor 107 at predetermined reference positions. Each distance sensor uses a laser beam to measure the distance between its respective reference position and the side surface of the dough chunk CH. Based on the distances, the width and positions of both side surfaces of the dough chunk CH can be given.

Based on the positions given of both side surfaces of the dough chunk CH, the center position of the dough chunk CH can be calculated by the controller along the width direction. Thus, the cutter 111B of the cutter 111 is automatically positioned on the center position of the dough chunk CH to cut the dough chunk into two equal pieces.

A usual servo mechanism may be used to automatically move the cutter 111 along the width direction of the feeding conveyor 107 and position it. Thus, no details are given.

The width sensor 109 is not limited to the construction stated above for measuring the width of the dough chunk CH. For example, a line sensor may be positioned above the feeding conveyor at a reference position to sense the positions of sides along the width direction and the width. Also, long contacting members may be used. They are positioned parallel to the feeding direction of the feeding conveyor 107. Also, they are positioned on the feeding conveyor 107 at both its sides. They can be moved reciprocally and perpendicularly to the feeding direction of the feeding conveyor 107. When each long contacting member moves from a reference position to a position at which it contacts the side surface of the dough chunk CH or it approaches the side surface, the position is sensed. Based on the positions, the positions of both sides and the width of the dough chunk CH are calculated.

As stated above, the cutter 111 is positioned downstream from the second metering conveyor 17. Thus, the dough chunk CH ran be divided into a plurality of equal pieces (eg., two equal pieces), so that the dough chunk, CH can be divided into relatively large pieces. Thus, the efficiency in the cutting can be increased.

The embodiment of this invention is explained above in relation to when the dough chunk CH is divided into pieces along a direction parallel to the feeding direction of the feeding conveyor 107. However, this invention is not limited to the above embodiment. The dough chunk CH may be divided into a plurality of equal pieces along a direction perpendicular to the feeding direction of the conveyor 107, after the length of the dough chunk CH is measured along the feeding direction. In that case an apparatus that has a proximity sensor may be used to sense the time from when it senses the front end of the dough chunk CH to when it senses the rear end on the feeding conveyor 107. Then, based on both the time elapsed and the conveying speed of the conveyor, the apparatus can calculate the length of the dough chunk CH. Also, another apparatus, i.e., one that has a line sensor, may be used to sense the positions of the front and rear ends of the dough chunk CH. Then the apparatus calculates the length of the dough chunk CH based on the positions.

Another guillotining cutter may be positioned above the feeding conveyor 107. The cutter operates when the middle position of the dough chunk CH reaches the cutter, so that it is divided into two equal pieces.

Below is explained how it is determined that the middle position of the dough chunk CH reaches the cutter The sensor senses the front end of the dough chunk CH at a predetermined position to determine the middle position of the dough chunk CH. Then the distance between the calculated middle position and the position of the cutter, which is previously known, is calculated. Then the distance is divided by the conveying speed to calculate the period from when the cutter reaches the front end to when it reaches the middle position. Thus, when the calculated time is reached after the sensor sensed the front end of the dough chunk CH, the cutter is operated to divide the dough CH into two pieces of equal length.

When the first and second metering conveyors 15, 17 continuously measure the weights of the dough sheet a number of times, flour etc. may adhere to the conveyor belts 87, 89, so that the accuracy of those conveyors is decreased. Thus, the zero adjustment is carried out for the first and second metering conveyors 15, 17 That is, when they measure the weight of the dough sheet a predetermined number of times or until a predetermined time passes, the feeding conveyor 13 is stopped. Then, to obtain a measurement the first and second metering conveyors 15, 17 are operated without putting the dough sheet on them. If there is a difference between the measured valve and the predetermined value that acts a reference, i.e., a zero, the controller 22 is used to change the predetermined value. Thus, even if flour etc. adheres to the conveyor belts 57, 89, the first and second metering conveyors 15, 17 can accurately measure the weight of the dough sheet. Thus, uniform dough chunks can always be divided out from the dough sheet, so that they can have equal weight.

According to this invention, the apparatus for supplying dough can readily be made compact. Also, it can readily be assembled when it is manufactured. Also, the apparatus can be disassembled to its components, so that the components can be easily cleaned.

Also, the apparatus can accurately measure the weight of the dough sheet, so that a dough chunk that has a predetermined weight, length, and thickness can easily be formed.

What is claimed is:

1. An apparatus for supplying food dough comprising
   a hopper that receives a large block of dough,
   a first cutter located at a lower opening of the hopper to cut the large block to form dough pieces that have a predetermined length and volume, a transmitting conveyor for transmitting the dough pieces, which are cut out by the cutter, to a dough feeder, said dough feeder having a plurality of rollers that are positioned like a V to form a dough sheet that has a constant thickness, a feeding conveyor for feeding the dough sheet, which is formed by the dough feeder to have the constant thickness, a metering conveyor for measuring weight of a part of the dough sheet, which is supplied by the feeding conveyor, while the metering conveyor feeds the dough sheet, and a second cutter for cutting out the part of the dough sheet when its weight that is measured by the metering conveyor reaches a predetermined value, characterized in that the first cutter and the dough feeder are arranged so that a part of the first cutter overlaps a part of an inlet of the dough feeder such that when the dough piece is at out by the first cutter, the lower end of the dough piece falls into an inlet of the dough feeder.

2. The apparatus of claim 1 wherein a belt of the transmitting conveyor is wound around the uppermost roller of the dough feeder.

3. The apparatus of claim 1 or 2 wherein any one of the hopper, the first cutter, the feeding conveyor; and the metering conveyor can easily be combined with and separated from the apparatus.

4. An apparatus for supplying food dough comprising a hopper that receives a large block of dough, a first cutter located at a lower opening of the hopper to cut the large block to form dough pieces that have a predetermined length and volume, a dough feeder for forming a dough sheet from the dough pieces, which are cut by the first cutter, a feeding conveyor for feeding the dough sheet, which is formed by the dough feeder to have a constant thickness, a first metering conveyor for measuring weight of a part of the dough sheet, which is supplied by the feeding conveyor, while the metering conveyor feeds the dough sheet, and a second cutter for cutting out the part of the dough sheet when its weight that is measured by the first metering conveyor reaches a predetermined value, characterized in that a second metering conveyor or a relative speed controlling conveyor is located near the first metering conveyor such that the relative speed between the feeding speed of the first metering conveyor and that of the second metering conveyor or the relative speed controlling conveyor is controllable, and in that the thickness and length of the part of the dough sheet, which is cut by the second cutter, can be controlled when the part of the dough sheet is transmitted from the first metering conveyor or the relative speed controlling conveyor.

5. The apparatus of claim 4 wherein the feeding speed of at least one of the first and second metering conveyors can be controlled, or the feeding speed of at least one of the first metering conveyor and the relative speed controlling conveyor can be controlled.

6. An apparatus for supplying food dough comprising a hopper that receives a large block of dough, a first cutter located at a lower opening of the hopper to cut the large block to dough pieces that have a predetermined length and a volume, a dough feeder for forming a dough sheet from the dough pieces, which are cut by the first cutter, a feeding conveyor for feeding the dough sheet, which is formed by the dough feeder to have a constant thickness, a metering conveyor for measuring weight of a part of the dough sheet, which is supplied by the feeding conveyor, while the metering conveyor feeds the dough sheet, and a second cutter for cutting out the part of the dough sheet when its weight that is measured by the first metering conveyor reaches a predetermined value, characterized in that a zero adjustment is carried out for the metering conveyor without putting the dough sheet on the metering conveyor when the metering conveyor measures parts of the dough sheet a predetermined numbers of times or when a predetermined time passes.

* * * * *

UNITED STATES PATENT AND TRADEMARK OFFICE
CERTIFICATE OF CORRECTION

| | |
|---|---|
| PATENT NO. | : 6,272,979 B1 |
| DATED | : August 14, 2001 |
| INVENTOR(S) | : Michio Morikawa et al. |

Page 1 of 1

It is certified that error appears in the above-identified patent and that said Letters Patent is hereby corrected as shown below:

<u>Title page,</u>
ABSTRACT, line 14, "end fans into" should read -- end falls into --.

<u>Column 11,</u>
Line 19, "at out" should read -- cut out --.
Line 25, "conveyor;" should read -- conveyor, --.

Signed and Sealed this

Thirtieth Day of April, 2002

*Attest:*

*Attesting Officer*

JAMES E. ROGAN
*Director of the United States Patent and Trademark Office*